(12) United States Patent
Viklund (10) Patent No.: US 10,647,263 B2
(45) Date of Patent: May 12, 2020

(54) HITCH STINGER WITH FLAT SURFACE WEDGES

(71) Applicant: Thule Sweden AB, Hillerstorp (SE)

(72) Inventor: Mark Viklund, New Milford, CT (US)

(73) Assignee: Thule Sweden AB, Hillerstorp (SE)

( * ) Notice: Subject to any disclaimer, the term of this patent is extended or adjusted under 35 U.S.C. 154(b) by 44 days.

(21) Appl. No.: 16/017,431

(22) Filed: Jun. 25, 2018

(65) Prior Publication Data

US 2019/0389395 A1 Dec. 26, 2019

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .... B60R 9/10; B60R 9/06; B60D 1/06; B60D 1/52
See application file for complete search history.

(56) References Cited

U.S. PATENT DOCUMENTS

| | | |
|---|---|---|
| 3,198,562 A | 8/1965 | Smith |
| 3,263,058 A | 7/1966 | Goonan |
| 3,971,186 A | 7/1976 | Havelka et al. |
| 4,856,929 A | 8/1989 | Smahlik et al. |
| 5,197,349 A | 3/1993 | Herman |
| 5,244,133 A | 9/1993 | Abbott et al. |
| 5,333,888 A | 8/1994 | Ball |
| 5,344,175 A | 9/1994 | Speer |
| 5,423,566 A | 6/1995 | Warrington et al. |
| 5,685,686 A | 11/1997 | Burns |
| 5,690,260 A | 11/1997 | Aikins et al. |
| 5,730,456 A * | 3/1998 | Bowers ............. B60D 1/52 280/491.5 |
| 5,915,900 A | 6/1999 | Boltz |
| 6,378,621 B1 | 4/2002 | Graham et al. |
| 6,598,897 B1 * | 7/2003 | Patti .................. B60D 1/06 280/478.1 |
| 6,835,021 B1 | 12/2004 | McMillan |
| 6,942,237 B1 | 9/2005 | Dépault |
| 6,951,287 B1 | 10/2005 | Randazzo |
| 6,974,147 B1 * | 12/2005 | Kolda ............... B60D 1/52 280/506 |

(Continued)

FOREIGN PATENT DOCUMENTS

WO  WO 2015/040844 A1  3/2015

*Primary Examiner* — Derek J Battisti
(74) *Attorney, Agent, or Firm* — Sterne, Kessler, Goldstein & Fox P.L.L.C.

(57) ABSTRACT

A hitch-mounted load carrier includes a connecting member configured to be inserted into a hitch receiver and a locking mechanism coupled to the connecting member and configured to secure the connecting member inside the hitch receiver. The locking mechanism includes a first actuator disposed in an interior of the connecting member, a second actuator opposite the first actuator disposed in the interior of the connecting member and coupled to the first actuator by a shaft, and a first wedge disposed at least partially in the interior of the connecting member. A first surface of the first wedge contacts the first actuator and a second surface of the first wedge contacts the second actuator. The first and second actuators are configured to radially translate the first wedge.

25 Claims, 9 Drawing Sheets

(56) References Cited

U.S. PATENT DOCUMENTS

| | | |
|---|---|---|
| 7,004,491 B1 | 2/2006 | Allsop et al. |
| 7,093,845 B1 | 8/2006 | Fast |
| 7,918,475 B2 * | 4/2011 | Musselman .............. B60D 1/26 |
| | | 280/491.5 |
| 8,596,664 B2 * | 12/2013 | Lahn ........................ B60D 1/06 |
| | | 280/495 |
| 9,027,950 B2 | 5/2015 | Lahn |
| 9,421,836 B1 | 8/2016 | Ford et al. |
| 9,663,040 B1 * | 5/2017 | Shen .......................... B60R 9/10 |
| 2002/0114688 A1 | 8/2002 | Poindexter et al. |
| 2006/0208456 A1 | 9/2006 | Weaver |
| 2009/0001109 A1 | 1/2009 | Wilkins |
| 2009/0218789 A1 | 9/2009 | Beck |
| 2010/0096424 A1 | 4/2010 | Kuschmeader et al. |
| 2010/0201102 A1 * | 8/2010 | Weaver .................. B60D 1/025 |
| | | 280/506 |
| 2010/0264627 A1 | 10/2010 | Mueller |
| 2010/0283225 A1 | 11/2010 | Lahn |
| 2011/0089669 A1 * | 4/2011 | Despres ................... B60D 1/06 |
| | | 280/478.1 |
| 2012/0228852 A1 | 9/2012 | Bessette et al. |
| 2013/0032621 A1 | 2/2013 | Bogoslofski et al. |
| 2013/0033021 A1 | 2/2013 | Prescott et al. |
| 2013/0193742 A1 | 8/2013 | Eidsmore |
| 2014/0246467 A1 | 9/2014 | Hein et al. |
| 2015/0083770 A1 | 3/2015 | Ziola |
| 2016/0096406 A1 | 4/2016 | Ford |
| 2018/0050645 A1 | 2/2018 | Phillips |

\* cited by examiner

HITCH STINGER WITH FLAT SURFACE WEDGES

BACKGROUND

Field

The present disclosure relates to hitch attachment devices. More specifically, embodiments of the present disclosure relate to hitch-mounted load carriers, for example, bicycle carriers, with a locking mechanism to secure the load carrier to a vehicle hitch.

Background

Devices for carrying equipment on a vehicle can be used to transport the equipment from one place to another. In some examples, the load carrier can be secured to the vehicle safely and conveniently via a hitch, typically attached to the rear of the vehicle. Various attachment mechanisms, for example, wedges, can help secure the load carrier to the vehicle hitch. These mechanisms, however, can lose torque over time, deemed torque-loss, or may damage or deform the interior of the hitch over time, causing the mechanism to be frequently manually resecured by the user.

BRIEF SUMMARY

In some embodiments, a hitch-mounted load carrier includes a connecting member configured to be inserted into a hitch receiver and a locking mechanism coupled to the connecting member and configured to secure the connecting member inside the hitch receiver. In some embodiments, the locking mechanism includes a first actuator disposed in an interior of the connecting member, a second actuator opposite the first actuator disposed in the interior of the connecting member and coupled to the first actuator by a shaft, and a first wedge disposed at least partially in the interior of the connecting member. In some embodiments, a first surface of the first wedge contacts the first actuator and a second surface of the first wedge contacts the second actuator. In some embodiments, the first and second actuators are configured to radially translate the first wedge.

In some embodiments, the hitch-mounted load carrier further includes a second wedge disposed at least partially in the interior of the connecting member. In some embodiments, the first and second actuators are configured to radially translate the second wedge. In some embodiments, the second wedge is disposed orthogonal to the first wedge. In some embodiments, a first surface of the second wedge contacts the first actuator and a second surface of the second wedge contacts the second actuator.

In some embodiments, the first surface of the first wedge is disposed at a first angle with respect to a longitudinal axis of the first wedge and the second surface is disposed at a second angle with respect to the longitudinal axis of the first wedge. In some embodiments, the first angle is between 20 degrees and 70 degrees. In some embodiments, the first angle and the second angle are equal. In some embodiments, a surface of the first actuator is disposed at a first angle with respect to a longitudinal axis of the shaft and the first angle of the first actuator is complementary to the first angle of the first wedge. In some embodiments, the first surface of the second wedge is disposed at a first angle with respect to a longitudinal axis of the second wedge and the second surface of the second wedge is disposed at a second angle with respect to the longitudinal axis of the second wedge.

In some embodiments, the first actuator is fixed within the interior of the connecting member. In some embodiments, the second actuator is configured to translate along a length of the shaft. In some embodiments, the shaft is threaded. In some embodiments, the first actuator is symmetric. In some embodiments, the first actuator is a truncated square pyramid.

In some embodiments, the first wedge protrudes through a first aperture in the connecting member in a locked configuration. In some embodiments, in a locked configuration the first wedge contacts an interior surface of the hitch. In some embodiments, the first and second wedges radially translate synchronously. In some embodiments, the first and second wedges include stainless steel. In some embodiments, the first wedge includes a first flange configured to engage an interior surface of the connecting member to retain the first wedge within the connecting member.

In some embodiments, a locking mechanism for a hitch-mounted load carrier includes an actuation assembly including a shaft, a first wedge including a first surface contacting the actuation assembly and a second surface contacting the actuation assembly, and a second wedge including a first surface contacting the actuation assembly and a second surface contacting the actuation assembly. In some embodiments, the actuation assembly is configured to radially translate the first and second wedges.

In some embodiments, the first surface of the first wedge is a first distal region and the second surface of the first wedge is a second distal region opposite the first distal region. In some embodiments, a distance between the first surface and the second surface of the first wedge is greater than about 30 mm. In some embodiments, the actuation assembly includes a first actuator coupled to a second actuator by the shaft. In some embodiments, in a locked configuration the first and second wedges are disposed at a greater radial distance from the shaft than in an unlocked configuration.

In some embodiments, the hitch-mounted load carrier is a hitch-mounted bicycle carrier.

In some embodiments, a method of attaching a load carrier to a vehicle includes inserting a connecting member into a hitch receiver, and engaging a locking mechanism coupled to the connecting member with the hitch receiver. In some embodiments, engaging the locking mechanism radially translates a first wedge and a second wedge through a first aperture and a second aperture, respectively, of the connecting member to contact an interior surface of the hitch receiver in a locked configuration. In some embodiments, engaging the locking mechanism includes rotating a shaft coupled to an actuation assembly. In some embodiments, engaging the locking mechanism includes rotating a knob coupled to the actuation assembly via the shaft. In some embodiments, releasing the locking mechanism includes rotating the shaft coupled to the actuation assembly in an opposite direction used to engage the locking mechanism. In some embodiments, engaging the locking mechanism radially translates first and second wedges synchronously to the locked configuration.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Figure 9:
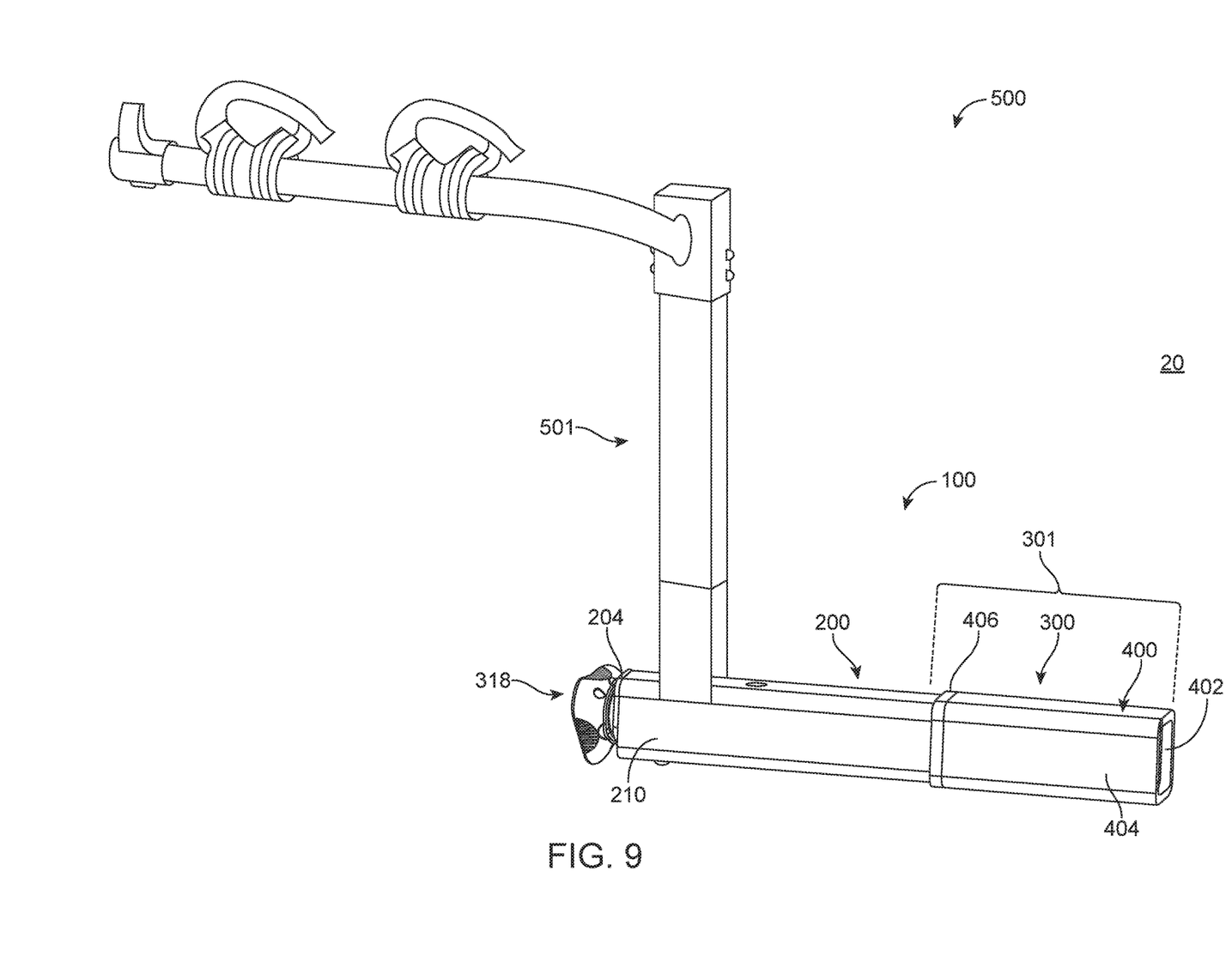
FIG. 9 illustrates a perspective view of a load carrier system with a load carrier for a hitch receiver, according to an embodiment.

Embodiments of the load carrier 100 disclosed herein can be used with a load carrier system 500, for example, but not limited to, a bicycle carrier or a cargo container. More specifically, the load carrier system 500 can be a hitch-mounted bicycle carrier, which can be attached to a hitch receiver 400 of a vehicle. The bicycle carrier can be configured to carry one, two, three, or more bicycles.

Hitch-mounted load carriers can have one or more attachment mechanisms to attach and secure the load carrier to the vehicle. For example, an attachment mechanism, such as a wedge or lever arm, that is coupled to the load carrier and that is disposed inside the vehicle hitch can provide pressure on an interior surface of the vehicle hitch for a friction-fit attachment. These mechanisms, however, can lose torque over time (also referred to herein as torque-loss). Further, the mechanisms may damage or deform the interior of the vehicle hitch over time, leading to greater torque-loss and difficulty for a user. Torque-loss causes frequent manual resecurement of the hitch-mounted load carrier by the user, and can even result in the load carrier becoming detached, causing possible damage to the load carrier, the carried items, and/or vehicles. Depending on the strength of the user attaching the load carrier, the weight of the load carrier, and other environmental conditions, it can be progressively difficult over time to secure the load carrier to the hitch receiver with the attachment mechanism.

The present disclosure provides embodiments of a load carrier with a locking mechanism and a connecting member where the locking mechanism includes an actuation assembly coupled to a wedge that protrudes through the connecting member in a locked configuration to secure the load carrier to a hitch receiver. And importantly, the arrangement and design of the locking mechanism reduces torque-loss. This allows the user to easily and confidently secure the load carrier to the hitch receiver without having to frequently resecure the load carrier or risk damaging the hitch receiver over time.

Figure 1:
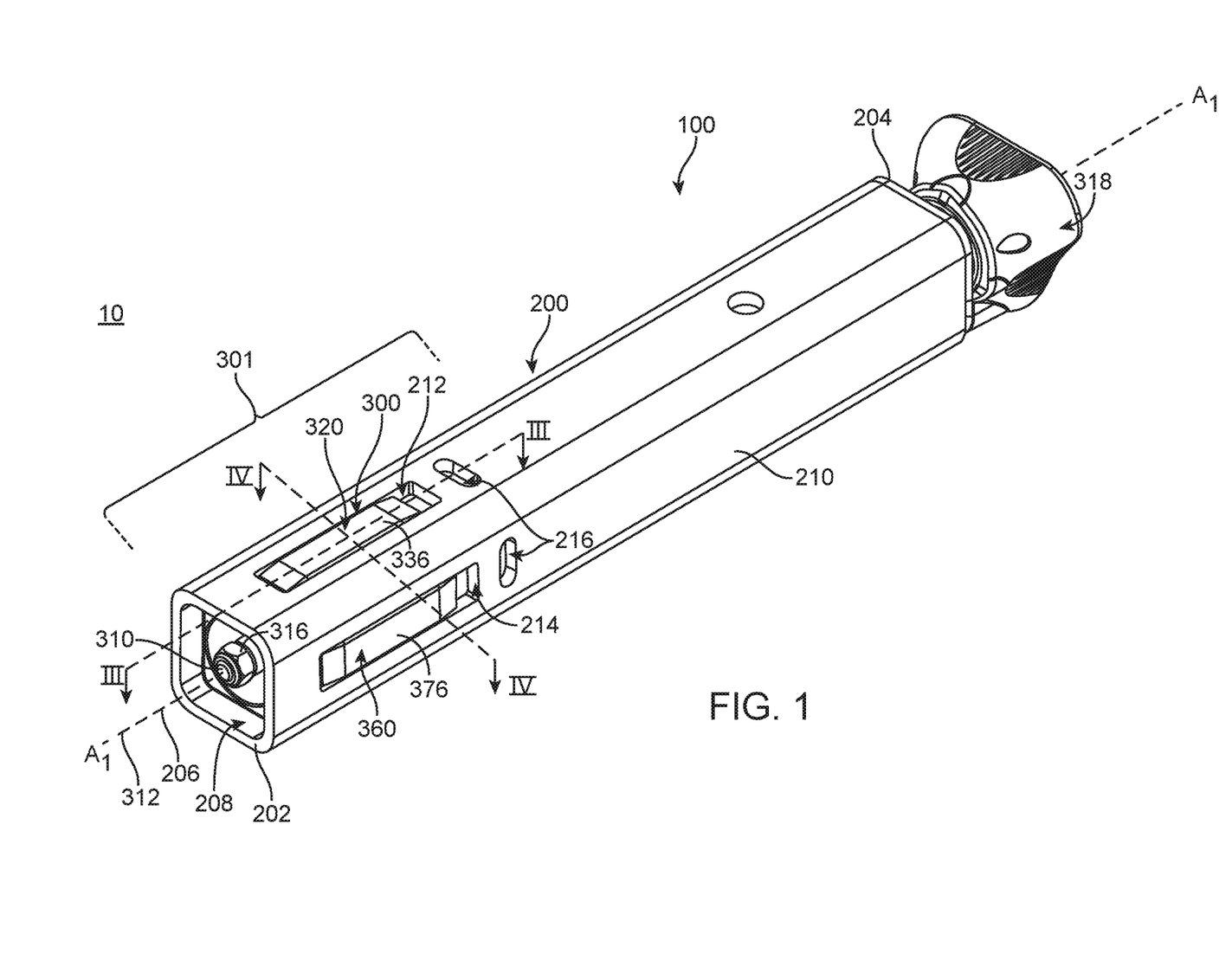
FIG. 1 illustrates a perspective view of a load carrier with a locking mechanism, according to an embodiment.
Figure 3:
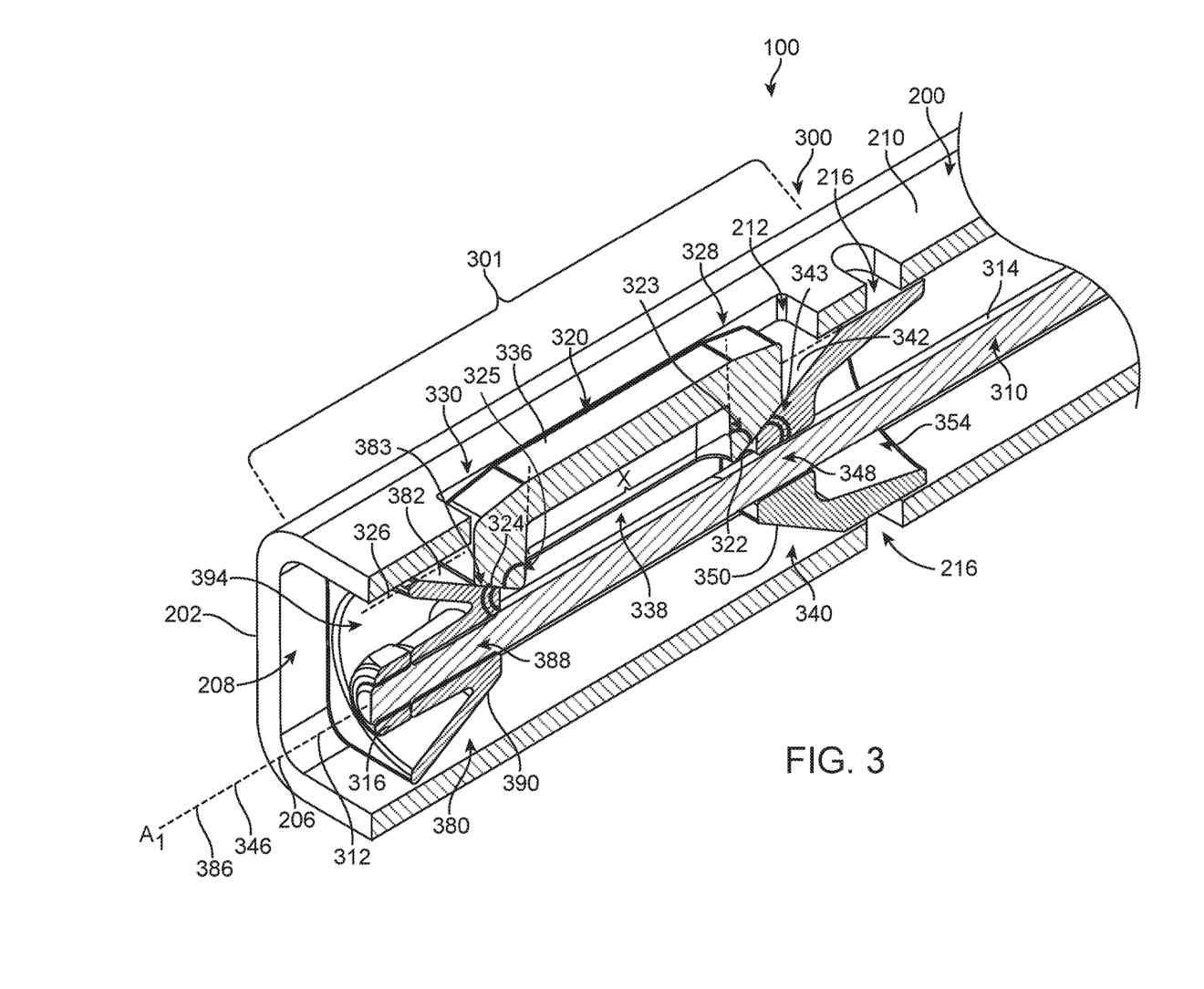
FIG. 3 illustrates a perspective longitudinal cross-sectional view of a portion of a load carrier, according to an embodiment.
Figure 4:
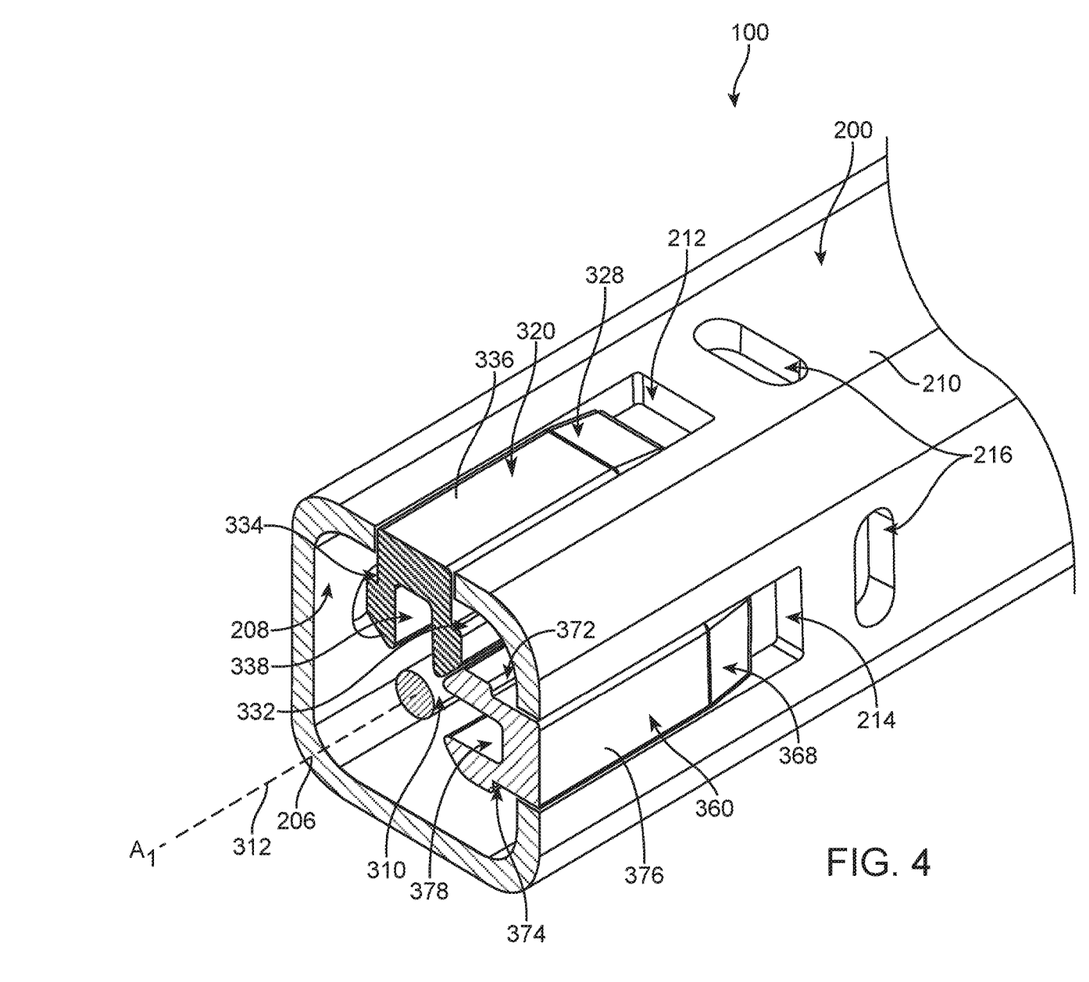
FIG. 4 illustrates a perspective transverse cross-sectional view of a portion of a load carrier, according to an embodiment.

By way of example, FIG. 1 illustrates load carrier 100 with connecting member 200 and locking mechanism 300. As shown, for example, in FIG. 9, connecting member 200 can be a portion of load carrier system 500 that attaches to hitch receiver 400 of a vehicle. Connecting member 200 can include distal end 202 and proximal end 204. Distal end 202 can be configured to be coupled to hitch receiver 400 of a vehicle. For example, distal end 202 can have a size and shape corresponding to interior surface 402 of hitch receiver 400, for example, a 1.25-inch or a 2-inch hitch receiver. For example, as shown in FIGS. 3 and 4, connecting member 200 can have a hollow square or rectangle shape with rounded corners when viewed in cross-section. Generally, connecting member 200 is a resilient material, for example, but not limited to, steel. Proximal end 204 can have support arm 501 of load carrier system 500 attached thereto, for example, a bicycle carrier as shown in FIG. 9. In some embodiments, load carrier system 500 can be configured to carry one or more bicycles. Other types of load carriers, such as cargo boxes or cargo platforms can be used.

Connecting member 200 includes exterior surface 210, interior surface 208 opposite exterior surface 210, and longitudinal axis 206 aligned with longitudinal axis A1 of load carrier 100. In some embodiments, as shown in FIG. 1, connecting member 200 can be a hollow cuboid with a cross-sectional thickness, for example, about 1 to 10 mm. Connecting member 200 includes first aperture 212 extending through exterior surface 210 and interior surface 208. In some embodiments, as shown in FIG. 1, connecting member 200 can include first aperture 212 and second aperture 214. For example, second aperture 214 can be disposed orthogonal to first aperture 212. In some embodiments, as shown in FIG. 1, connecting member 200 can include one or more ports 216 configured to secure locking mechanism 300. For example, ports 216 can be used for spot welding locking mechanism 300 to connecting member 200.

Figure 7:
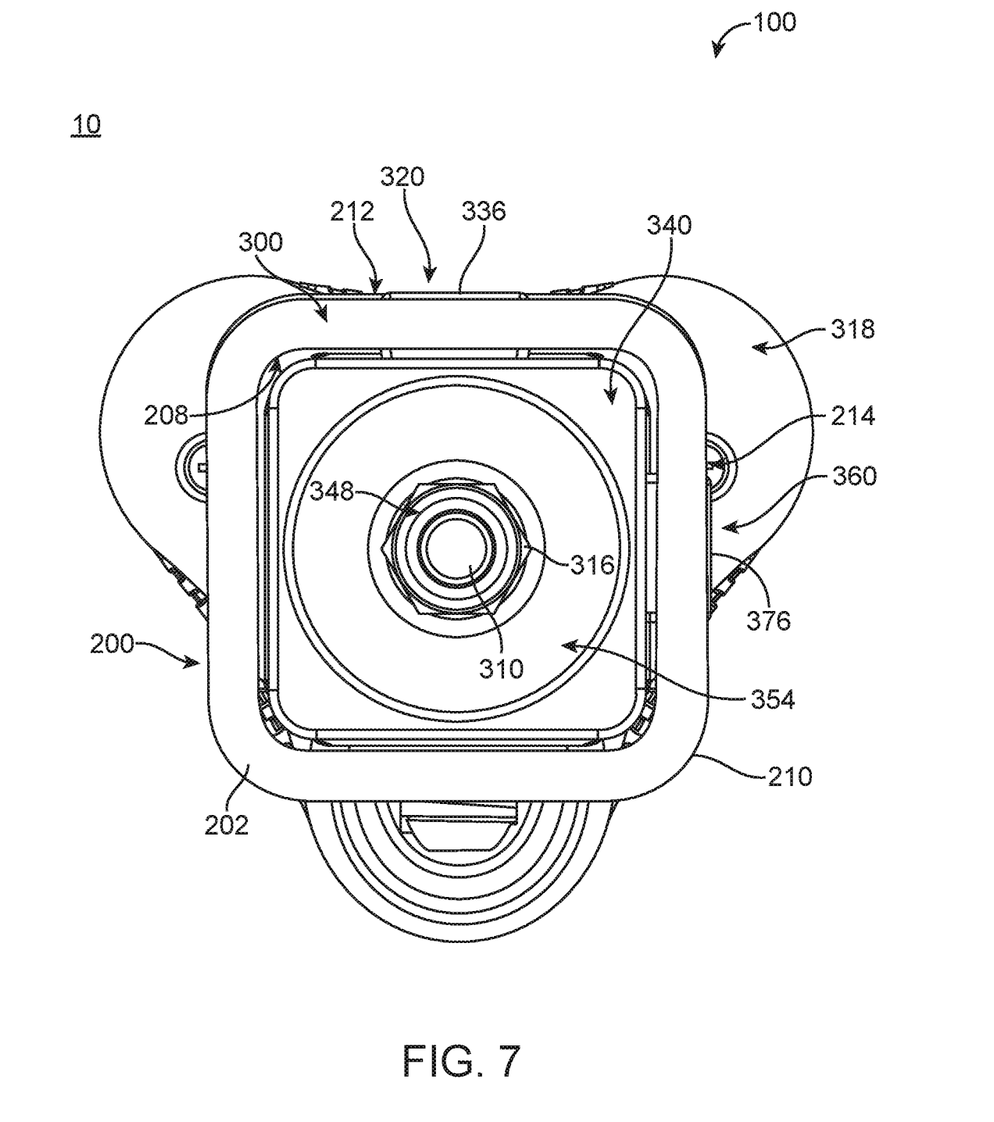
FIG. 7 illustrates a front view of a load carrier in an unlocked configuration, according to an embodiment.

As shown, for example, in FIGS. 1 and 9, locking mechanism 300 can be attached to connecting member 200. As shown in FIGS. 1 and 7, locking mechanism 300 can be disposed in an unlocked position 10 (also referred to as a retracted position), where first wedge 320 is recessed in first aperture 212 below exterior surface 210. In some embodiments, unlocked position 10 can include first wedge 320 recessed in first aperture 212 and second wedge 360 recessed in second aperture 214, both below exterior surface 210. In some embodiments, first wedge 320 and/or second wedge 360 can protrude beyond exterior surface 210 in unlocked position 10. In some embodiments, prior to inserting into the hitch receiver 400, the user can move locking mechanism 300 into the unlocked position 10 by rotating knob 318, which radially retracts first wedge 320 and/or second wedge 360. As described herein, first wedge 320 and second wedge 360 can remain in the unlocked position 10, without being held by the user. As shown, for example, in FIGS. 8 and 9, locking mechanism 300 can be disposed in a locked position 20 (also referred to as a protruded position), with first wedge 320 and second wedge 360 contacting interior surface 402 of hitch receiver 400.

Hitch receiver 400 can include exterior surface 404 and interior surface 402. In some embodiments, in the locked position 20, first wedge 320 and second wedge 360 of locking mechanism 300 can contact interior surface 402 to secure load carrier 100 to hitch receiver 400 and reduce torque-loss. In some embodiments, hitch receiver 400 can include hitch flange 406, for example, at a distal end of hitch receiver 400. Hitch flange 406 can be a surface extending from exterior surface 404 of hitch receiver 400. In some embodiments, hitch flange 406 can extend around the entirety of exterior surface 404.

Figure 2:
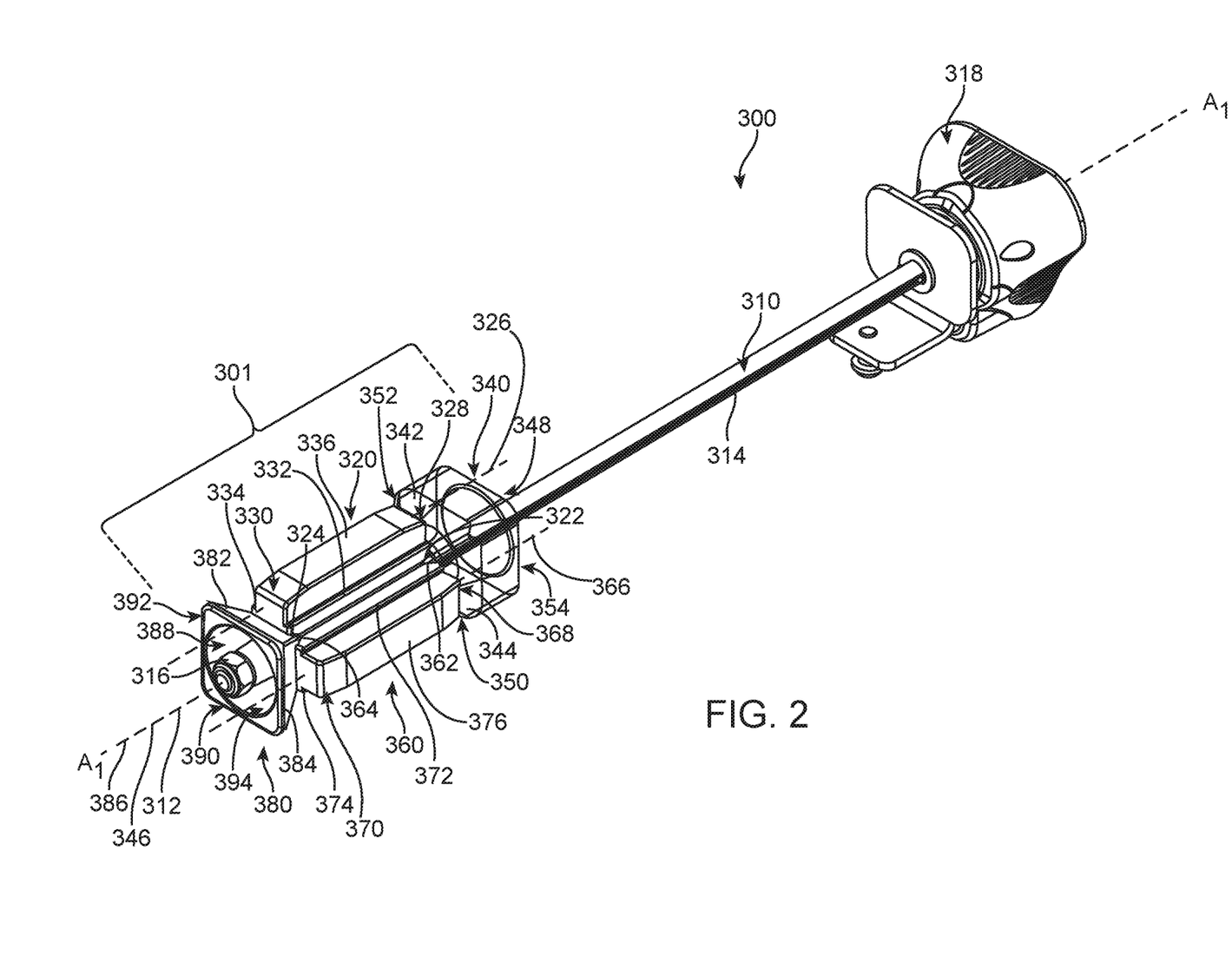
FIG. 2 illustrates a perspective view of a locking mechanism, according to an embodiment.

FIGS. 1-4 illustrate elements of load carrier 100. In some embodiments, load carrier 100 can include connecting member 200 and locking mechanism 300. In some embodiments, as shown in FIG. 2, where connecting member 200 is removed, locking mechanism 300 can include actuation assembly 301, shaft 310, fastener 316, and knob 318, all aligned along longitudinal axis A1. As shown, for example, in FIG. 2, locking mechanism 300 can include first wedge 320, second wedge 360, and actuation assembly 301. In some embodiments, actuation assembly 301 can include first actuator 340 and second actuator 380 opposite first actuator 340. In some embodiments, locking mechanism 300 can include only first wedge 320. In some embodiments, as knob 318 is rotated, the applied torque is transferred to shaft 310, which linearly translates second actuator 380 along longitudinal axis A1 in order to contact first wedge 320 and second wedge 360, and radially translate first and second wedges 320, 360 through first and second apertures 212, 214 of connecting member 200. In some embodiments, as shown in FIG. 2, shaft 310 can include threads 314 to secure fastener 316. For example, fastener 316 can be a locking nut.

Figure 6:
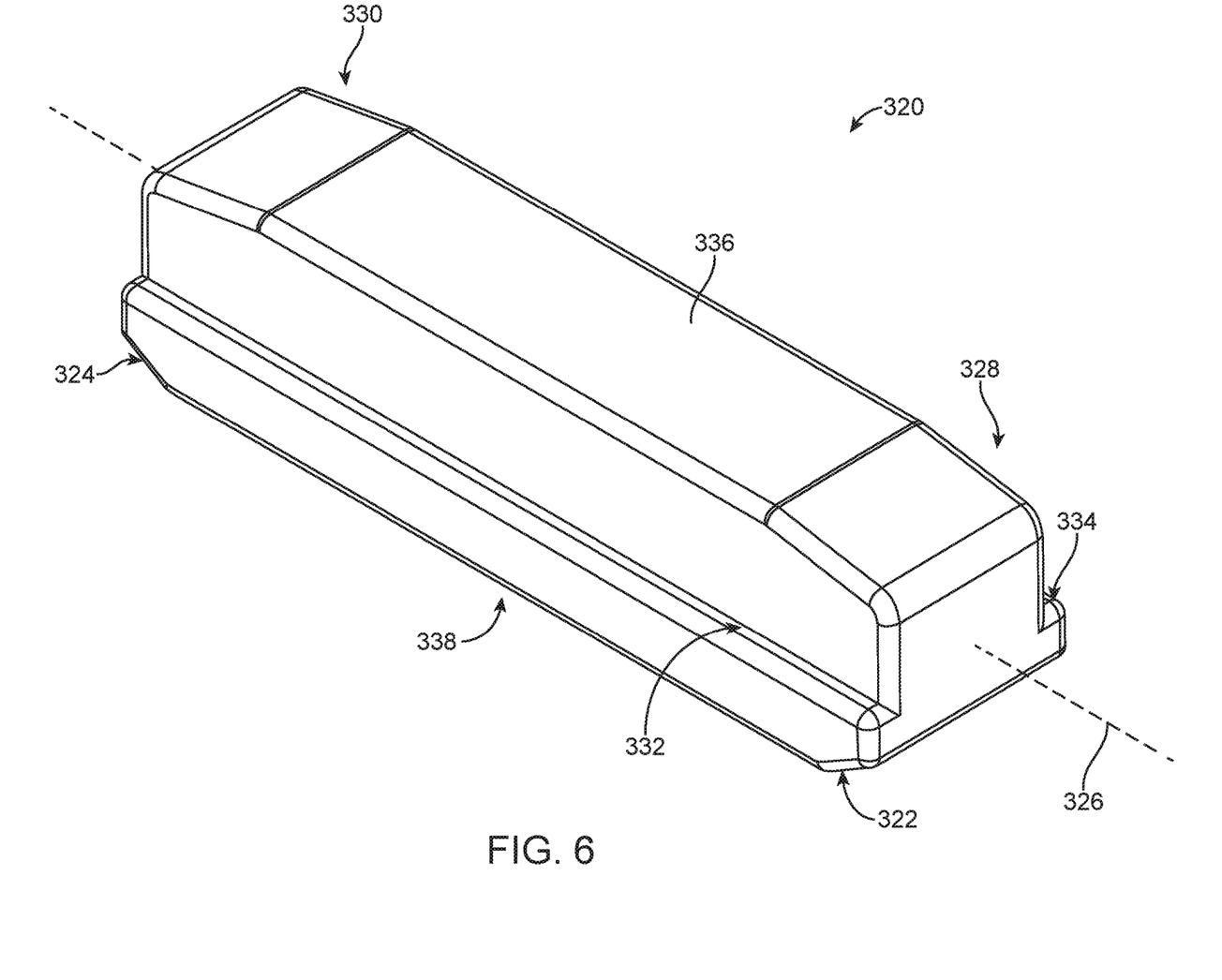
FIG. 6 illustrates a perspective view of a wedge for a load carrier locking mechanism, according to an embodiment.

As shown in FIGS. 2 and 6, in some embodiments, first wedge 320 can be a solid rectangular cuboid shape. In some embodiments, first wedge 320 can have a length of about 30 mm to 100 mm, a width of about 10 mm to 40 mm, and a height of about 5 mm to 30 mm. In some embodiments, first wedge 320 can be made of a rigid material, for example, metals (e.g., steel, stainless steel, iron, aluminum, tungsten, lead, titanium, etc.), metal oxides, ceramics, polymers, or other similar rigid material. As shown in FIGS. 2, 3, and 6, first wedge 320 can include first contact surface 322 in first distal region 328, second contact surface 324 in second distal region 330, and longitudinal axis 326. In some embodiments, first contact surface 322 and second contact surface 324 are angled contact surfaces with respect to an axis perpendicular to longitudinal axis 326. For example, first and second contact surfaces 322, 324 can be angled between 20 degrees and 70 degrees. For example, as shown in FIG. 3, first contact surface 322 can be angled at first angle 323 and second contact surface 324 can be angled at second angle 325. In some embodiments, first and second contact surfaces 322, 324 can have the same angle. In some embodiments, as shown in FIG. 3, first contact surface 322 and second contact surface 324 are separated by a distance X. In some embodiments, distance X can be greater than about 30 mm. In some embodiments, as shown in FIG. 6, first wedge 320 can include first flange 332 and second flange 334 extending along longitudinal axis 326. First wedge 320 can include hitch contact surface 336, which is a flat surface configured to evenly contact interior surface 402 when in locked position 20. In some embodiments, as shown in FIG. 3, first wedge 320 can include cavity 338 to save material and reduce weight.

Second wedge 360 shown in FIGS. 1, 2, and 4 is similar to first wedge 320 described above and shown in FIGS. 3 and 6 and can include any of the features described with respect thereto. As shown in FIG. 2, second wedge 360 can have a solid rectangular cuboid shape. In some embodiments, second wedge 360 can be made of a rigid material, for example, metals (e.g., steel, stainless steel, iron, aluminum, tungsten, lead, titanium, etc.), metal oxides, ceramics, polymers, or other similar rigid material. In some embodiments, second wedge 360 can include first contact surface 362 in first distal region 368, second contact surface 364 in second distal region 370, and longitudinal axis 366. In some embodiments, first contact surface 362 and second contact surface 364 are angled contact surfaces with respect to an axis perpendicular to longitudinal axis 366. For example, first and second contact surfaces 362, 364 can be angled between 20 degrees and 70 degrees. In some embodiments, first and second contact surfaces 362, 364 can have the same angle. In some embodiments, similar to first wedge 320, first contact surface 362 and second contact surface 364 are separated by a distance X. In some embodiments, distance X can be greater than about 30 mm. In some embodiments, as shown in FIG. 2, second wedge 360 can include first flange 372 and second flange 374 extending along longitudinal axis 366. Second wedge 360 can include hitch contact surface 376, which is a flat surface configured to evenly contact interior surface 402 when in locked position 20. In some embodiments, second wedge 360 can include cavity 378 to save material and reduce weight.

In some embodiments, as shown in FIG. 2, second wedge 360 can be disposed orthogonal to first wedge 320. In some embodiments, second wedge 360 can be disposed opposite first wedge 320 on a parallel plane. In some embodiments, first and second wedges 320, 360 can be disposed adjacent a corner of connecting member 200. In some embodiments, locking mechanism 300 can include a plurality of wedges. For example, locking mechanism 300 can include four wedges, each similar to first wedge 320 and disposed on each face of connecting member 200. In some embodiments, locking mechanism 300 can include a plurality of wedges arranged symmetrically about connecting member 200.

Figure 5:
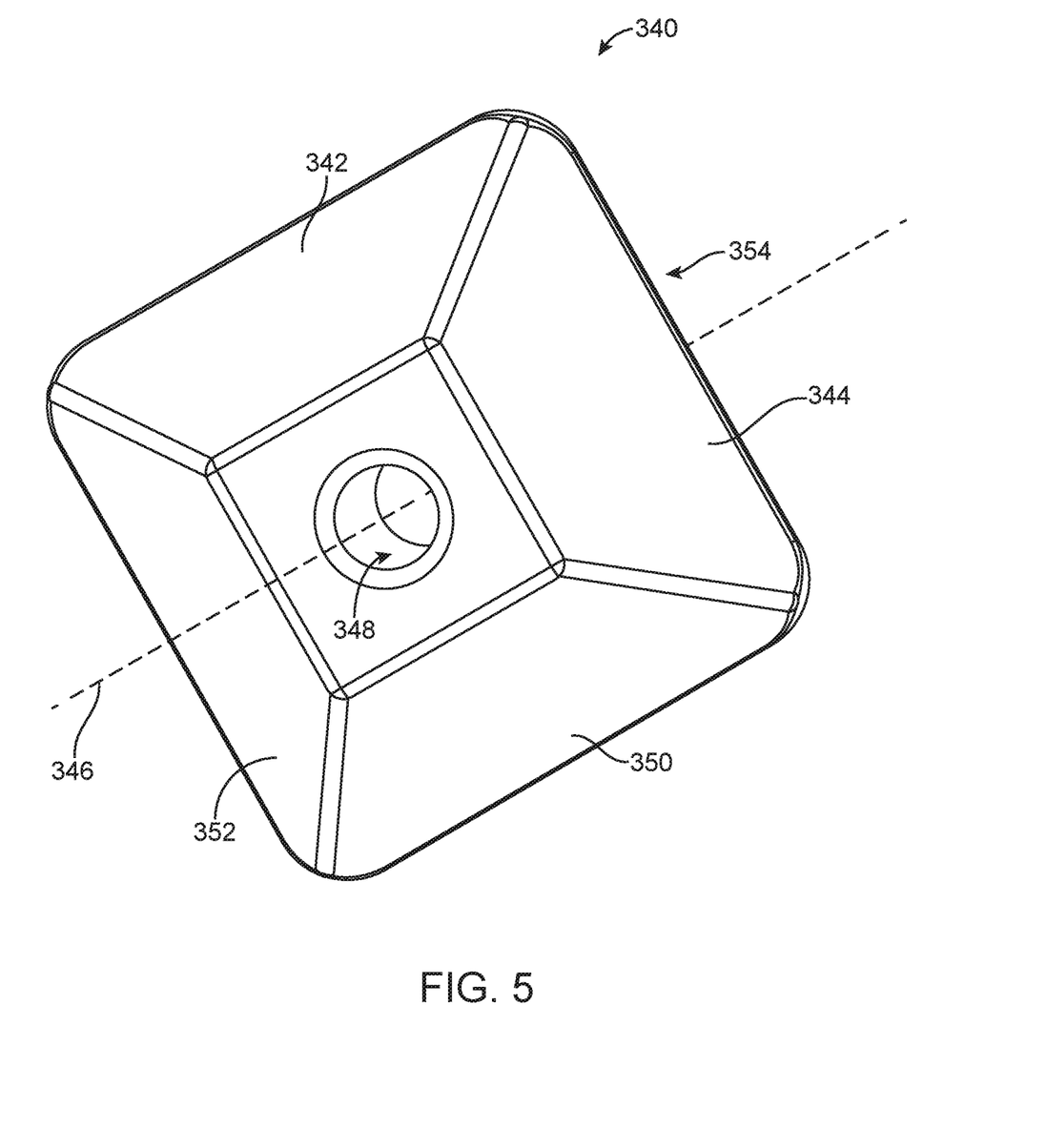
FIG. 5 illustrates a perspective view of an actuator for a load carrier locking mechanism, according to an embodiment.

As shown in FIGS. 2 and 5, first actuator 340 can be a solid shape, having a through hole 348. In some embodiments, first actuator 340 can be symmetric. For example, as shown in FIGS. 2 and 5, first actuator 340 can be a truncated square pyramid. In some embodiments, first actuator 340 can be made of a rigid material, for example, metals (e.g., steel, stainless steel, iron, aluminum, tungsten, lead, titanium, etc.), metal oxides, ceramics, polymers, or other similar rigid material. As shown in FIG. 5, first actuator 340 can include first contact surface 342, second contact surface 344, third surface 350, fourth surface 352, and longitudinal axis 346. In some embodiments, first contact surface 342 and second contact surface 344 are angled contact surfaces with respect to longitudinal axis 346. For example, first and second contact surfaces 342, 344 can be angled between 20 degrees and 70 degrees. In some embodiments, first and second contact surfaces 342, 344 can have the same angle. In some embodiments, first contact surface 342 and second contact surface 344 of first actuator 340 can be angled complementary to first contact surface 322 of first wedge 320 and first contact surface 362 of second wedge 360, respectively. For example, as shown in FIG. 3, first complementary angle 343 is complementary to first angle 323 and first complementary angle 383 is complementary to second angle 325. In some embodiments, as shown in FIG. 5, first actuator 340 can include through hole 348 configured to receive shaft 310 of locking mechanism 300. In some embodiments, first actuator 340 can be fixed to connecting member 200. For example, first actuator 340 can be secured by ports 216 by, for example, spot welding. First contact surface 342 and second contact surface 344 of first actuator 340 are configured to contact first contact surface 322 of first wedge 320 and first contact surface 362 of second wedge 360. In some embodiments, as shown in FIGS. 2 and 3, first actuator 340 can include cavity 354 to save material and reduce weight.

Second actuator 380 shown in FIGS. 2 and 3 is similar to first actuator 340 described above and shown in FIG. 5, and can include any of the features described with respect thereto. As shown in FIG. 2, second actuator 380 can be a solid shape, having a through hole 388. In some embodiments, second actuator 380 can be symmetric. For example, as shown in FIG. 2, second actuator 380 can be a truncated square pyramid. In some embodiments, second actuator 380 can be made of a rigid material, for example, metals (e.g., steel, stainless steel, iron, aluminum, tungsten, lead, titanium, etc.), metal oxides, ceramics, polymers, or other similar rigid material. As shown in FIG. 2, second actuator 380 can include first contact surface 382, second contact surface 384, third surface 390, fourth surface 392, and longitudinal axis 386. In some embodiments, first contact surface 382 and second contact surface 384 are angled contact surfaces with respect to longitudinal axis 386. For example, first and second contact surfaces 382, 384 can be angled between 20 degrees and 70 degrees. In some embodiments, first and second contact surfaces 382, 384 can have the same angle. In some embodiments, first contact surface 382 and second contact surface 384 of second actuator 380 can be angled complementary to second contact surface 324 of first wedge 320 and second contact surface 364 of second wedge 360, respectively. In some embodiments, as shown in FIG. 2, second actuator 380 can include through hole 388 configured to receive shaft 310 of locking mechanism 300. For example, second actuator 380 can be secured via through hole 388 to shaft 310 via fastener 316.

In some embodiments, second actuator 380 can be configured to linearly translate along longitudinal axis A1. For example, second actuator 380 can linearly translate along longitudinal axis A1 as a function of threads 314 of shaft 310 rotating, for example, from a torque applied to knob 318. First contact surface 382 and second contact surface 384 of second actuator 380 are configured to contact second contact surface 324 of first wedge 320 and second contact surface 364 of second wedge 360. In some embodiments, as shown in FIGS. 2 and 3, second actuator 380 can include cavity 394 to save material and reduce weight.

In some embodiments, as shown in FIG. 2, first actuator 340 can be disposed opposite to second actuator 380, so that first and second contact surfaces 342, 344 of first actuator 340 face towards first and second contact surface 382, 384 of second actuator 380. In some embodiments, first and second actuators 340, 380 can be parts of an actuation assembly 301. In some embodiments, locking mechanism 300 can include a plurality of actuators. For example, locking mechanism 300 can include first actuator 340 and opposing second actuator 380, each as a symmetric truncated square pyramid.

Referring to FIG. 3, which illustrates a longitudinal cross-section of a portion of load carrier 100, actuation assembly 301 is configured to radially translate first wedge 320 disposed at least partially in interior surface 208 of connecting member 200. In some embodiments, as shown in FIG. 3, actuation assembly 301 includes first actuator 340 coupled to second actuator 380 by shaft 310 along longitudinal axis A1. In some embodiments, first actuator 340 and second actuator 380 are configured to radially translate first wedge 320 and second wedge 360. For example, first and second wedges 320, 360 can radially translate synchronously. In some embodiments, second actuator 380 can linearly translate along a length of shaft 310 aligned along longitudinal axis A1 as a function of shaft 310 being rotated by knob 318 toward first wedge 320 and second wedge 360 in order to contact second contact surface 324 of first wedge 320 and second contact surface 364 of second wedge 360, respectively. For example, as second actuator 380 contacts second contact surface 324, the linear force applied along longitudinal axis A1 is transferred to first wedge 320 and first actuator 340 in order to radially translate first wedge 320 through first aperture 212, for example, to protrude through first aperture 212 in locked configuration 20. In some embodiments, first actuator 340 is fixed and as second actuator 380 contacts second contact surfaces 324, 364, the linear force applied along longitudinal axis A1 is transferred to first and second wedges 320, 360 and fixed first actuator 340 in order to radially translate first and second wedges 320, 360 through first and second apertures 212, 214, respectively, for example, to protrude through first and second apertures 212, 214, respectively, in locked configuration 20.

Referring to FIG. 4, which illustrates a transverse cross-section of a portion of load carrier 100, first wedge 320 is disposed orthogonal to second wedge 360 and both first and second wedges 320, 360 are at least partially within interior surface 208 of connecting member 200. In some embodiments, as shown in FIG. 4, first wedge 320 can include first and second flanges 332, 334 configured to engage interior surface 208 of connecting member 200 to retain first wedge 320 within connecting member 200 by contacting interior surface 208. First and second flanges 332, 334 are thus prevented from falling out of connecting member 200. And as first wedge 320 is radially translated through first aperture 212, first and second flanges 332, 334 limit the distance that first wedge 320 extends beyond exterior surface 210 of connecting member 200. In some embodiments, as shown in FIG. 4, second wedge 360 includes first and second flanges 372, 374, are likewise configured to engage interior surface 208 of connecting member 200 to retain second wedge 360 within connecting member 200.

Figure 8:
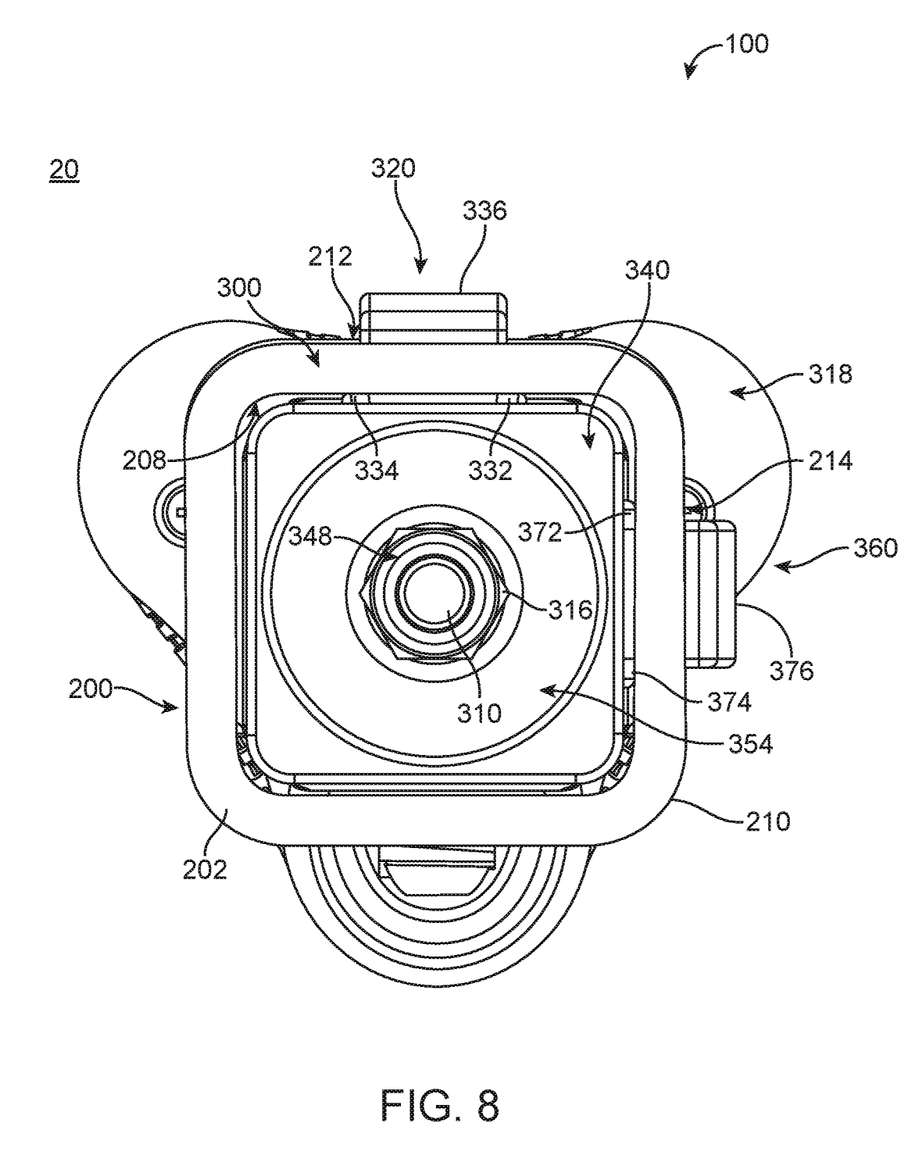
FIG. 8 illustrates a front view of a load carrier in a locked configuration, according to an embodiment.

FIGS. 7 and 8 illustrate load carrier 100 in unlocked configuration 10 and locked configuration 20, respectively, according to embodiments. In some embodiments, as shown in FIGS. 7 and 8, first and second wedges 320, 360 are disposed at a greater radial distance from shaft 310 in locked configuration 20 than unlocked configuration 10. In some embodiments, as shown in FIG. 8, first and second wedges 320, 360 protrude through first and second apertures 212, 214, respectively, of connecting member 200 in locked configuration 20. For example, first and second wedges 320, 360 can protrude about 1 mm to 10 mm beyond exterior surface 210. In some embodiments, first and second wedges 320, 360 each contact interior surface 402 of hitch receiver 400 in locked configuration 20.

FIG. 9 illustrates an embodiment of load carrier system 500. As shown in FIG. 9, load carrier system 500 can include support arm 501, load carrier 100, and hitch receiver 400. In some embodiments, connecting member 200 of load carrier 100 can be coupled to support arm 501. As shown in FIG. 9, load carrier 100 can be disposed in hitch receiver 400 such that first and second wedges 320, 360 contact interior surface 402 to secure load carrier 100 to hitch receiver 400 in locked configuration 20. In some embodiments, as shown in FIG. 9, load carrier system 500 is a hitch-mounted bicycle carrier.

Other types of actuators are contemplated beyond those illustrated in the Figures. For example, in some embodiments, actuation assembly 301 can be a mechanism that applies a linear force to first and second contact surfaces 322, 324 of first wedge 320 and first and second contact surfaces 362, 364 of second wedge 360 in order to radially translate both first and second wedges 320, 360. For example, actuation assembly 301 can be a gear assembly. In some embodiments, actuation assembly 301 can be a mechanism that applies a linear force in a direction perpendicular to hitch contact surfaces 336, 376 of first wedge 320 second wedge 360, respectively, in order to radially translate both first and second wedges 320, 360. Actuation assembly 301 can be other shapes, sizes, and configurations. Moreover, actuation assembly 301 can include other actuation mechanisms, including but not limited to, mechanical, electronic, or magnetic actuation devices. For example, actuation assembly 301 can be coupled to first and second wedges 320, 360 electromagnetically in locked configuration 20.

Methods of securing a load carrier to a hitch receiver can be accomplished according to the manners of operation disclosed herein. In some embodiments, load carrier 100 can be disposed in unlocked position 10. In some embodiments, this can be accomplished by the user, for example, by moving or rotating knob 318 to place locking mechanism 300 in unlocked position 10. In some embodiments, load carrier 100 can be retained in unlocked position 10, without the user holding knob 318.

In some embodiments, connecting member 200, for example, connecting member 200 of load carrier 100, can be inserted into hitch receiver 400, for example, hitch receiver 400 of a vehicle or load carrier system 500. In some embodiments, locking mechanism 300 of load carrier 100 can be manipulated, for example, using knob 318 to engage hitch receiver 400 in locked configuration 20. In some embodiments, locking mechanism 300 can contact hitch receiver 400, for example, at hitch flange 406 of hitch receiver 400. In some embodiments, first and second wedges 320, 360 of locking mechanism 300 can contact an interior surface 402 of hitch receiver 400. In some embodiments, rotating knob 318 can translate second wedge 360 in a linear direction, thereby displacing first and second wedges 320, 360 in a radial direction.

It is to be appreciated that the Detailed Description section, and not the Brief Summary and Abstract sections, is intended to be used to interpret the claims. The Summary and Abstract sections may set forth one or more but not all exemplary embodiments of load carriers and locking mechanisms as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A hitch-mounted load carrier, comprising:
 a connecting member configured to be inserted into a hitch receiver; and
 a locking mechanism coupled to the connecting member and configured to secure the connecting member inside the hitch receiver, the locking mechanism comprising:
  a first actuator disposed in an interior of the connecting member;
  a second actuator opposite the first actuator disposed in the interior of the connecting member and coupled to the first actuator by a shaft; and
  a first wedge disposed at least partially in the interior of the connecting member,
  wherein a first surface of the first wedge contacts the first actuator and a second surface of the first wedge contacts the second actuator, and
  wherein the first and second actuators are configured to radially translate the first wedge.

2. The hitch-mounted load carrier of claim 1, further comprising a second wedge disposed at least partially in the interior of the connecting member, wherein the first and second actuators are configured to radially translate the second wedge.

3. The hitch-mounted load carrier of claim 2, wherein the second wedge is disposed orthogonal to the first wedge.

4. The hitch-mounted load carrier of claim 2, wherein a first surface of the second wedge contacts the first actuator and a second surface of the second wedge contacts the second actuator.

5. The hitch-mounted load carrier of claim 1, wherein the first surface of the first wedge is disposed at a first angle with respect to a longitudinal axis of the first wedge and the second surface is disposed at a second angle with respect to the longitudinal axis of the first wedge.

6. The hitch-mounted load carrier of claim 5, wherein the first angle is between 20 degrees and 70 degrees.

7. The hitch-mounted load carrier of claim 5, wherein the first angle and the second angle are equal.

8. The hitch-mounted load carrier of claim 5, wherein a surface of the first actuator is disposed at a first angle with respect to a longitudinal axis of the shaft and the first angle of the first actuator is complementary to the first angle of the first wedge.

9. The hitch-mounted load carrier of claim 4, wherein the first surface of the second wedge is disposed at a first angle with respect to a longitudinal axis of the second wedge and the second surface of the second wedge is disposed at a second angle with respect to the longitudinal axis of the second wedge.

10. The hitch-mounted load carrier of claim 1, wherein the first actuator is fixed within the interior of the connecting member.

11. The hitch-mounted load carrier of claim 1, wherein the second actuator is configured to translate along a length of the shaft.

12. The hitch-mounted load carrier of claim 1, wherein the shaft is threaded.

13. The hitch-mounted load carrier of claim 1, wherein the first wedge protrudes through a first aperture in the connecting member in a locked configuration.

14. The hitch-mounted load carrier of claim 1, wherein in a locked configuration the first wedge contacts an interior surface of the hitch.

15. The hitch-mounted load carrier of claim 2, wherein the first and second wedges radially translate synchronously.

16. The hitch-mounted load carrier of claim 2, wherein the first and second wedges comprise stainless steel.

17. The hitch-mounted load carrier of claim 1, wherein the first wedge comprises a first flange configured to engage an interior surface of the connecting member to retain the first wedge within the connecting member.

18. The hitch-mounted load carrier of claim 1, wherein the first actuator is symmetric.

19. The hitch-mounted load carrier of claim 18, wherein the first actuator is a truncated square pyramid.

20. A locking mechanism for a hitch-mounted load carrier, comprising:
   an actuation assembly comprising a shaft;
   a first wedge comprising a first surface contacting the actuation assembly and a second surface contacting the actuation assembly; and
   a second wedge comprising a first surface contacting the actuation assembly and a second surface contacting the actuation assembly,
   wherein the actuation assembly is configured to radially translate the first and second wedges.

21. The locking mechanism of claim 20, wherein the first surface of the first wedge is a first distal region and the second surface of the first wedge is a second distal region opposite the first distal region.

22. The locking mechanism of claim 21, wherein a distance between the first surface and the second surface of the first wedge is greater than about 30 mm.

23. The locking mechanism of claim 20, wherein the actuation assembly comprises a first actuator coupled to a second actuator by the shaft.

24. The locking mechanism of claim 20, wherein in a locked configuration the first and second wedges are disposed at a greater radial distance from the shaft than in an unlocked configuration.

25. The locking mechanism of claim 20, wherein the hitch-mounted load carrier is a hitch-mounted bicycle carrier.

* * * * *